United States Patent [19]

Topper

[11] Patent Number: 5,268,895
[45] Date of Patent: Dec. 7, 1993

[54] SIGNALING MESSAGE ROUTING CONTROL USING COMPOSITE POINT CODE STATUS

[75] Inventor: Jeffrey Topper, Tokyo, Japan
[73] Assignee: NEC Corporation, Tokyo, Japan
[21] Appl. No.: 704,426
[22] Filed: May 23, 1991
[30] Foreign Application Priority Data
  May 23, 1990 [JP] Japan .................................. 2-132825
[51] Int. Cl.⁵ ...................... H04Q 11/04; H04M 7/00
[52] U.S. Cl. .................................... 370/58.3; 370/60;
  370/60.1; 370/68.1; 379/220; 379/221;
  379/230; 340/827
[58] Field of Search ..................... 370/110.1, 54, 85.6,
  370/94.1, 94.2, 94.3, 58.1, 58.2, 58.3, 60, 60.1,
  68.1, 16, 13; 379/220, 221, 229, 230, 208, 113,
  243; 340/825.5, 825.51, 827

[56] References Cited

U.S. PATENT DOCUMENTS

| | | | |
|---|---|---|---|
| 4,979,118 | 12/1990 | Kheradpir | 370/54 |
| 4,984,264 | 1/1991 | Katsube | 379/220 |
| 5,042,064 | 8/1991 | Chung et al. | 379/243 |
| 5,067,074 | 11/1991 | Farel et al. | 379/113 |
| 5,128,932 | 7/1992 | Li | 370/85.6 |

Primary Examiner—Douglas W. Olms
Assistant Examiner—Hassan Kizou

[57] ABSTRACT

In a common channel signaling network which includes a plurality of signaling points or point codes connected to each other by signaling data links, a routing message is received from a remote signaling point via a signaling data link and translated into availability states and congestion levels of a message transfer controller and a signaling subsystem controller part and stored into a point code status memory. A composite state of a point code is derived from the stored availability states and congestion levels to create a local database. In accordance with the composite state of a point code, the routing of signaling messages to that point code is controlled. In response to a request, the composite state of a point code of the network is reported to the requesting user. The composite states of the code points are constantly monitored. When a change occurs, a new composite state is broadcast to all users.

13 Claims, 9 Drawing Sheets

| MTP STATE | SCCP STATE | MTP CONGESTION LEVEL | SCCP CONGESTION LEVEL | COMPOSITE PC STATUS |
|---|---|---|---|---|
| ALLOWED | ALLOWED | 0 | 0 | ALLOWED |
| | | | n | C(n) |
| | | m | 0 | C(m) |
| | | | n | C(ℓ) |
| | PROHIBITED | 0 | 0 | PROHIBITED |
| | | | n | |
| | | m | 0 | |
| | | | n | |
| PROHIBITED | ALLOWED | 0 | 0 | |
| | | | n | |
| | | m | 0 | |
| | | | n | |
| | PROHIBITED | 0 | 0 | |
| | | | n | |
| | | m | 0 | |
| | | | n | |

NOTE: ℓ, m, n are positive integers equal to or greater than 0. Interger "ℓ" is the greater of integers "m" and "n".

SIGNALING MESSAGE ROUTING CONTROL USING COMPOSITE POINT CODE STATUS

BACKGROUND OF THE INVENTION

The present invention relates generally to digital communications networks, and more specifically to signaling message routing control.

According to CCITT Recommendations Q.711–Q. 714 for Signaling System Number 7, message transfer part (MTP) serves as a transport system for users. It transfers signaling messages between user locations and is responsible for providing physical links, providing data link control functions, and routing messages between user locations. Signaling connection control part (SCCP) is situated between the user layers and the MTP to provide additional functions to the MTP and to support both connectionless and connection-oriented network services between signaling nodes, or signaling points. More specifically, SCCP management of Signaling System Number 7 maintains the congestion status of remote signaling points with which it has a signaling relationship. SCCP management also informs local users of changes in the states of point codes (signaling node identifiers) and subsystem numbers it monitors. How network congestion is to be handled within the SCCP is not specified by the Recommendations. However, it is specified that users of the SCCP are to be notified of changes in the status of point codes and SCCP users with which the SCCP maintains a signaling relationship. It is unrealistic to expect each local application process to maintain multiple point code states since they can rely on the SCCP to determine when the availability of remote point codes and subsystem numbers change.

Since many applications which use the SCCP conceivably cannot make use of point code and subsystem number data, it is desirable that SCCP provide a minimum level of checking for its users. It is further desirable to restore connectionless traffic to recovering signaling nodes in a phased manner to prevent the signaling network from suddenly being overwhelmed by a surge of traffic in a manner which does not interfere Message Transfer Part (MTP) allowed/prohibited state and SCCP allowed/prohibited state procedures. It is desirable that the phased recovery procedure be implemented in the network layer to relieve user processes from the burden of handling what is properly a network layer function.

Furthermore, it is desirable that point code availability and congestion control checks be implemented in the SCCP control to remove the requirement that each user maintain a database containing the availability and congestion states of each network address (i.e., point code plus subsystem number) with which it communicates.

SUMMARY OF THE INVENTION

It is therefore an object of the present invention to provide signaling message routing control which relieves user processes from the burden of maintaining point code availability status and congestion levels.

It is a further object of the present invention to provide signaling message routing control which prevents the signaling network from being overwhelmed with a surge of connectionless traffic during recovery of a signaling node.

It is a further object of the present invention to provide signaling message routing control which allows application processes to be simplified.

According to the present invention, there is provided a common channel signaling network comprising a plurality of signaling points interconnected by signaling data links. Each of the signaling points includes a message transport controller coupled to a signaling data link of the network for transmitting and receiving messages to and from remote signaling points, the received messages containing management information concerning the remote signaling points. The signaling point further includes a subsystem controller connected to the message transport controller for directing messages to user terminals. The subsystem controller comprises a point code status controller for analyzing the management information and maintaining an availability state of the message transport controller of the remote signaling points, an availability state of the subsystem controller of the remote signaling points, a congestion level of the message transport controller of the remote signaling points and a congestion level of the subsystem controller of the remote signaling points, deriving, from the maintained availability states and congestion levels, a composite state for each remote signaling point, and presenting the composite state to the user terminals. A routing controller is provided in the subsystem controller for routing the message between the message transport controller and the user terminals in accordance with the composite state.

The point code status controller presents the composite state to the user terminals upon request therefrom and presents a new composite state to the user terminals when an update occurs in the previous composite state.

The routing controller receives a message from the user terminals indicating its priority level, compares it the composite state, and passing the received message to the message transport controller if the priority level is higher than a level indicated by the composite state or blocks the received message if the priority level is lower than the indicated level.

To implement phased recovery, the point code status controller decrements the value of the SCCP congestion level at periodic intervals.

BRIEF DESCRIPTION OF THE DRAWINGS

The present invention will be described in further detail with reference to the accompanying drawings, in which.

DETAILED DESCRIPTION

Figure 1:
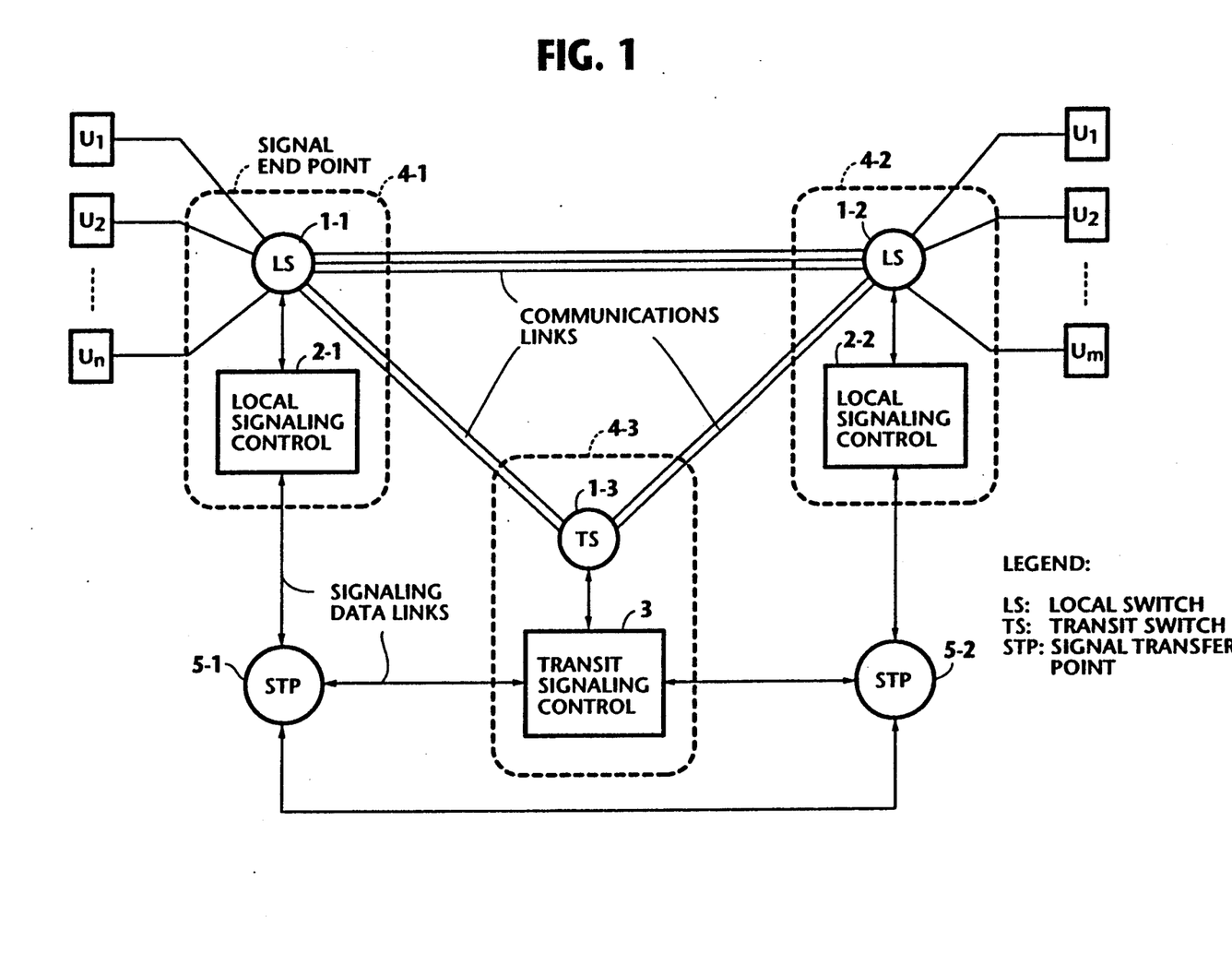
FIG. 1 is a block diagram of an integrated communications network incorporating the signaling network of the present invention.

Referring now to FIG. 1, there is shown an integrated communications network embodying the present invention. For simplicity, the integrated network comprises local switches 1-1 and 1-2 for serving user terminals $U_i$, and a transit switch 1-3. Switches 1-1, 1-2 and 1-3 are either circuit-switching or packet-switching systems and interconnected by communications links to form an information network for carrying switched signals such as voice, data, facsimile or video, between user terminals.

Local signaling controllers 2-1 and 2-2 and a transit signaling controller 3 are associated with switches 1-1, 1-2 and 1-3, respectively, to constitute signal end points 4-1, 4-2 and 4-3. The signaling controllers are interconnected by full-duplex signaling data links via signal transfer points 5-1 and 5-2 to form a signaling network in order for signaling messages to be transmitted from an originating signal end point to a destination signal end point according to CCITT Recommendations Q.711–Q.714 (Blue Book, the 9th Plenary Assembly, 1988) for Signaling System Number 7. According to the CCITT Recommendations, the network's signaling nodes including transfer points and signal end points are represented by unique identifiers called "point codes".

Figure 2:
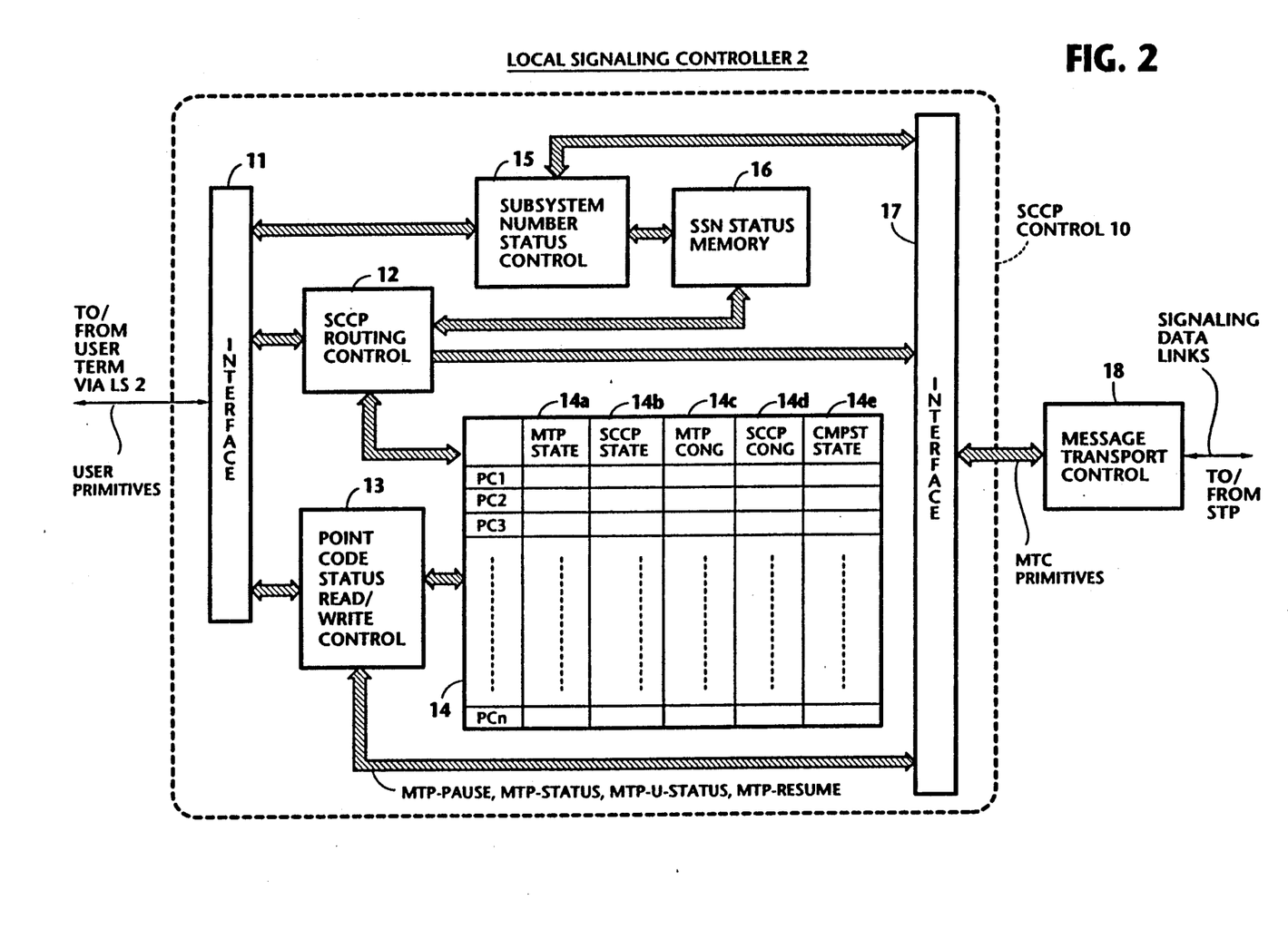
FIG. 2 is a block diagram illustrating details of a local signaling controller.

Details of local signaling controllers 2 are shown in FIG. 2. Controller 2 generally comprises a Signaling Connection Control Part (SCCP) controller 10 and a message transport controller 18. The SCCP controller 10 includes a user-network interface 11 which interfaces the user terminals with an SCCP routing controller 12 and a point code (PC) status read/write controller 13. The SCCP routing controller 12 is connected to read/write controller 13 and to an interface 17. A composite point-code status memory 14 is connected to the read/write controller 13. The PC status memory 14 serves as a local database and is divided into memory cells corresponding to remote signaling nodes, or point codes. The memory cells are further divided into fields 14a, 14b, 14c, 14d and 14e for respectively storing MTP allowed/prohibited state, SCCP allowed/prohibited state, MTP congestion level and SCCP congestion level, and composite point-code state.

A signaling message transmitted from user terminals includes a network address which contains a source point code, a destination point code and a subsystem number, or global title which uniquely defines the address of an application-specific entity to which the signaling message is addressed froma signaling node. The global title is a data string which can be input into an OSI (Open System Interconnection) Layer 3 translation algorithm, i.e., a global title translator, to derive another network address.

Message transport controller 18 is connected to interface 17 to send a signaling message it receives though an appropriate signaling data link to a remote signal transfer point according to the point code and the subsystem number contained in the message and receives a routing message from the remote signaling node and translates it into MTC (message transport control) primitives including such indications as MTP-PAUSE, MTP-STATUS (n), MTP-U-STATUS (UP available, UP unavailable) and MTP-RESUME, for coupling to interface 17 in which it is translated into an indication and supplied to read/write controller 13 (where n is aninteger representing the congestion level in the range between O and N and UP represents the user part).

A sybsystem number (SSN) status controller 15 is connected between interfaces 11 and 17 and associated with an SSN status memory 16 which maintains state functions for point code-subsystem number (PC-SSN) combinations for which it maintains management state data. The subsystem number state function has one of two values: prohibited and allowed. The subsystem number state function is received from a remote management function, not shown, via the signaling data links. A subsystem number becomes "prohibited" when a signaling message is received from a remote management function identifying the PC-SSN combination as being unavailable. A subsystem number also becomes unavailable when the composite point code status in memory 14 for the associated point code becomes "prohibited". Once in the prohibited state, the subsystem number remains prohibited until a message is received from a remote management function identifying the PC-SSN combination as being available, in which case the SSN becomes "allowed". Subsystem number status controller 15 controls the contents of memory 16 in accordance with signals it receives through interface 17 from message transport controller 18.

The SCCP routing controller 12 checks the availability of the network address to which the signaling message has been routed. When a subsystem number is not included in the destination address, routing controller 12 checks point code availability and congestion level using the composite point code status information stored in memory 14. When both a point code and a subsystem number are included in the network address, routing controller 12 checks the status of the destination SSN as well as the point code status and does not pass the message to message transport controller 18 if either the point code or subsystem number to which the message has been routed are in the prohibited state. Routing controller 12 thus blocks signaling messages destined for network addresses at which peer level process is unavailable. As will be described later, routing controller 12 also blocks the message if priority level of the message, set by the user, is lower than a congestion level determined by read/write controller 13 for the destination signaling node.

Point code status read/write controller 13 is programmed to perform subroutines shown in FIGS. 3A-3E to create a local database in the composite point code status memory 14, report composite point code status information to a requesting user terminal and broadcast a new composite point code status if there is a change in the composite point code state of any signaling node.

Figure 3A:
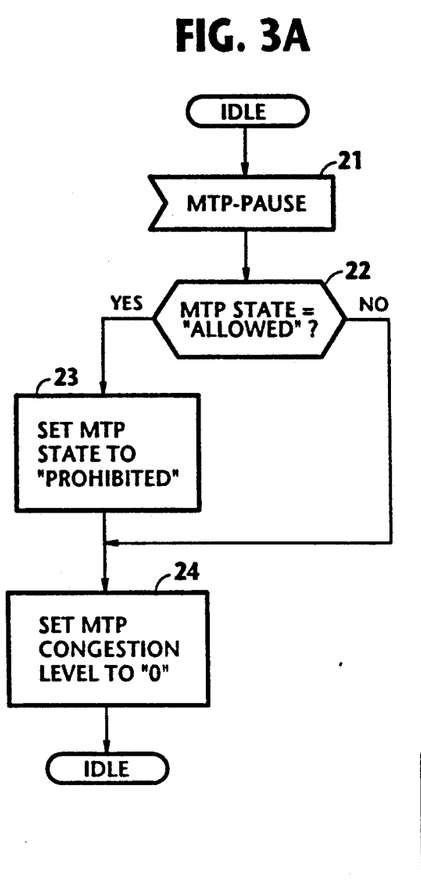
FIGS. 3A to 3E are flowcharts describing instructions performed by the point code read/write controller of FIG. 2 when storing the states and congestion levels of MTP (message transfer part) and SCCP peer-to-peer routing messages.

In FIG. 3A, if read/write controller 13 receives an MTP-PAUSE indication (step 21) from message transport controller 18 in response to a routing message from a remote signaling node, control proceeds to step 22 to address the memory 14 to read the MTP status field of a memory cell corresponding to the point code contained in the received routing message and checks to see if it is in the "allowed" state. If the answer is affirmative, the MTP status field is set to "prohibited" and the MTP congestion level field of the memory cell is reset to zero (step 24). If the answer is negative in step 22, control proceeds to step 24, skipping step 23.

Figure 3B:
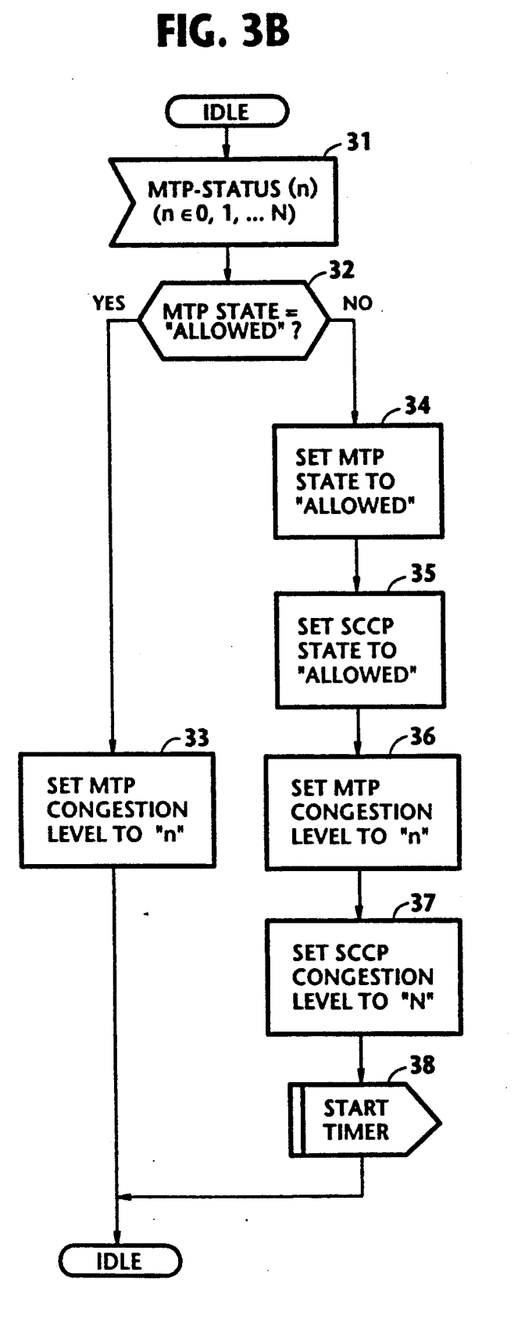

In FIG. 3B, if an MTP-STATUS (n) indication is received from message transport controller 18 (step 31), control proceeds to step 32 to check the contents of the MTP status field of the corresponding PC memory cell. If it is in the allowed state, exit is to step 33 to set the MTP congestion level field of the PC memory cell to the congestion level "n" as specified by the MTP-STATUS indication. If the MTP status field is the prohibited state, control exits to step 34 to set it to "allowed" state and moves on to step 35 to set the SCCP status field of the PC memory cell to "allowed" state. Exit then is to step 36 which directs the setting of the MTP congestion field of the memory cell to "n", and then to step 37 in which the SCCP congestion level field of the memory cell is set to the maximum congestion value "N". To successively decrement the congestion value N, a timer is started (step 38).

Figure 3C:
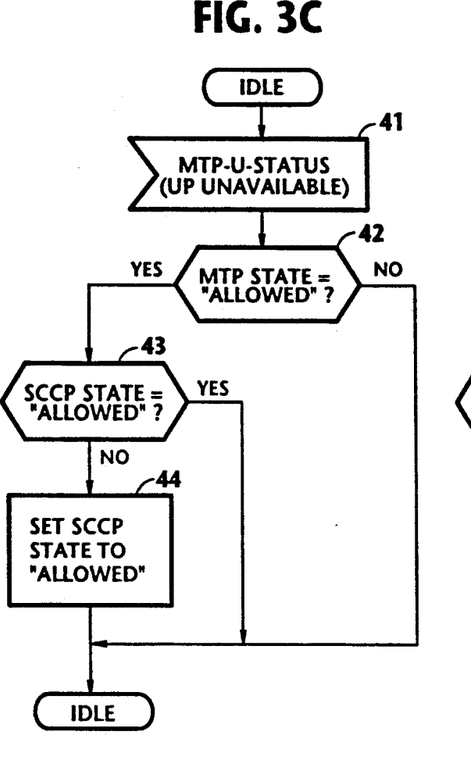

In FIG. 3C, if an MTP-U-STATUS (UP unavailable) primitive is received from MTP controller 18 (step 41), the MTP status field of the corresponding memory cell is checked (step 42). If the MTP status field is in the allowed state, the SCCP status field of the memory cell is checked (step 43). If the latter is the prohibited state, control proceeds to step 44 to set the SCCP status field to "allowed". If the answer is negative in step 42 or affirmative in step 43, control returns to idle state.

Figure 3D:
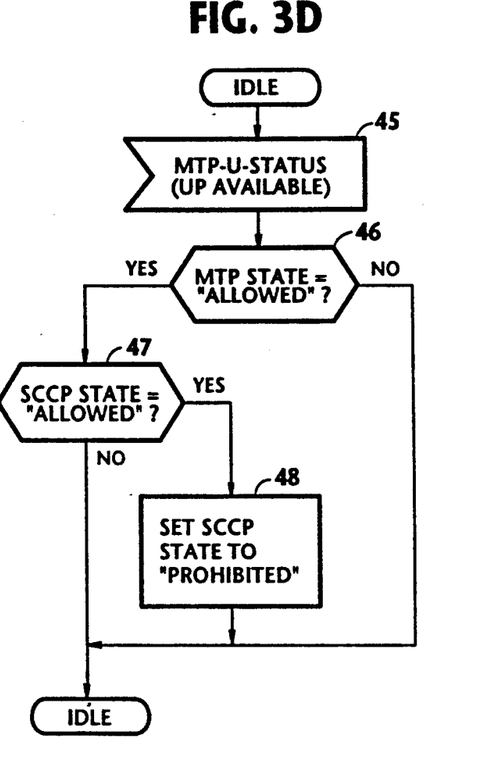

In FIG. 3D, if an MTP-U-STATUS (UP available) primitive is received from MTP controller 18 (step 45), the MTP status field of the corresponding memory cell is checked (step 46). If it is in the allowed state, the SCCP status field of the memory cell is checked (step 47). If the latter is in the allowed state, control proceeds to step 48 to set the SCCP status field to "prohibited". If negative decision is made in step 46 or step 47, control returns to idle state.

Figure 3E:
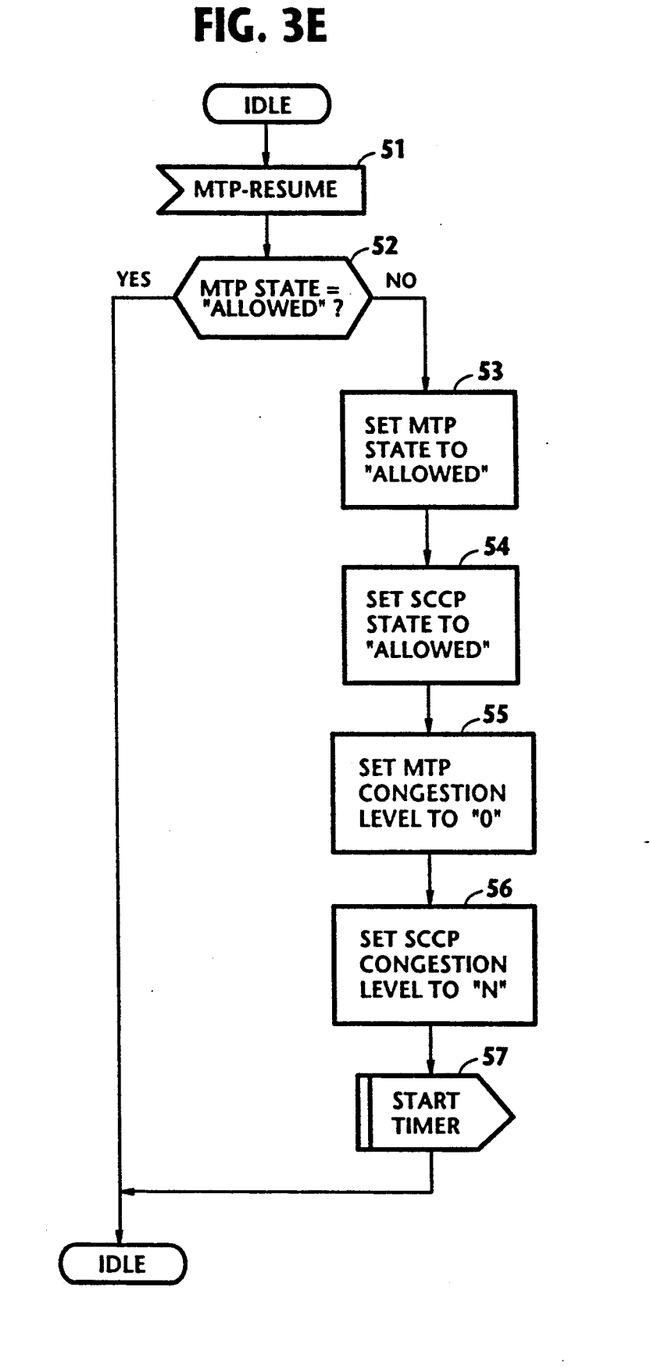

In FIG. 3E, when an MTP-RESUME indication is received (step 51), the MTP status field of the corresponding cell is checked (step 52). If it is the prohibited state, exit is to a series of steps 53 through 57 in which the MTP state is set to "allowed" (step 53), the SCCP state is set to "allowed" (step 54), the MTP congestion level is reset to "0" (step 55) and the SCCP congestion level is set to N (step 56). Finally, the timer is started (step 57) to successively decrement the congestion level N. If the answer is affirmative in step 52, control returns to idle state.

Figure 4:
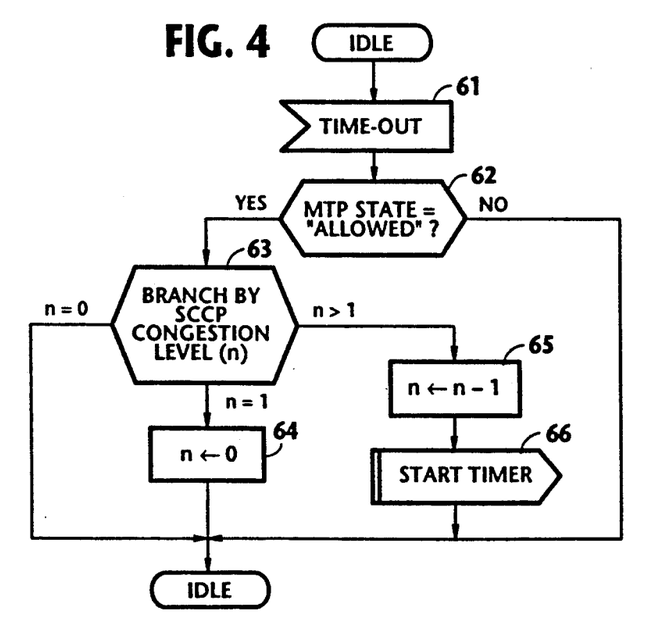
FIG. 4 is a flowchart associated with FIGS. 3B and 3E.

In FIG. 4, when the timer produces an output upon expiration of a prescribed time-out period (step 61), the MTP status field of the PC memory cell which has triggered the timer is checked (step 62). If it has changed to the allowed state, exit is to step 63 to check the SCCP congestion level field of the corresponding memory cell. If the SCCP congestion level (n) is equal to 1, exit is to step 64 to reset "n" to zero and if "n" is greater than unity, exit is to step 65 to decrement "n" by 1 and the timer is started again (step 66). It is seen that the process is repeated until m becomes equal to 0, whereupon control exits from step 63 and enters idle state. In this way, the congestion level N of step 38 (FIG. 3B) and step 57 (FIG. 3E) is successively decremented to zero.

Figure 6:
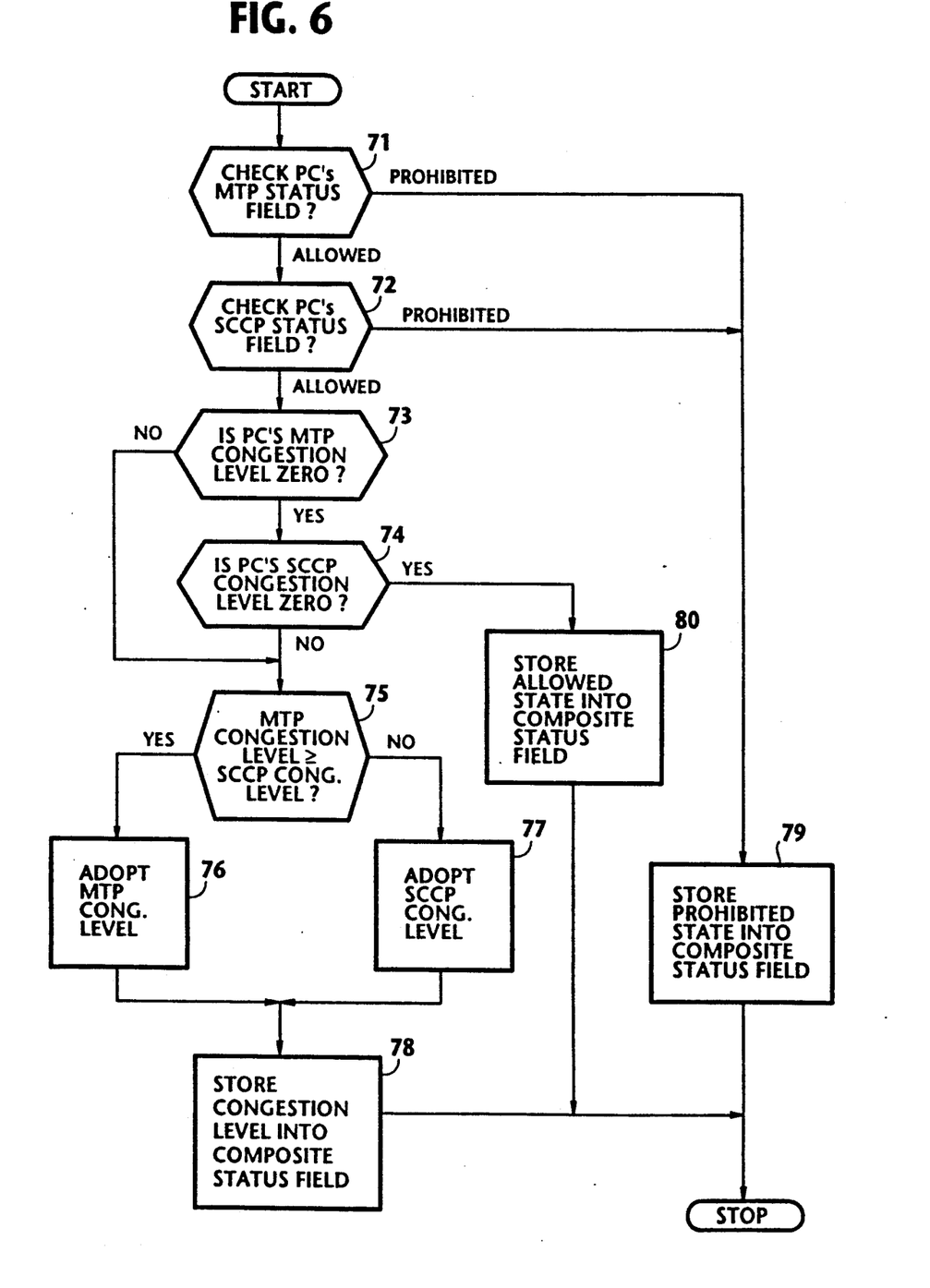
FIG. 6 is a flowchart describing instructions performed by the point code read/write controller when deriving composite point code states from the MTP and SCCP states and congestion levels.

FIG. 6 summarizes the algorithms described in FIGS. 3A through 3F. There are two possible states in the SCCP status field for each of the two possible states of the corresponding MTP status field. There are two possible MTP congestion states, noncongested (level 0) or congested (level m), as well as two possible SCCP congestion states, noncongested (level 0) or congested (level n). It is seen that the MTP allowed/prohibited state, SCCP allowed/prohibited state, MTP congestion level and SCCP congestion level are each maintained separately within the SCCP.

Figure 8:
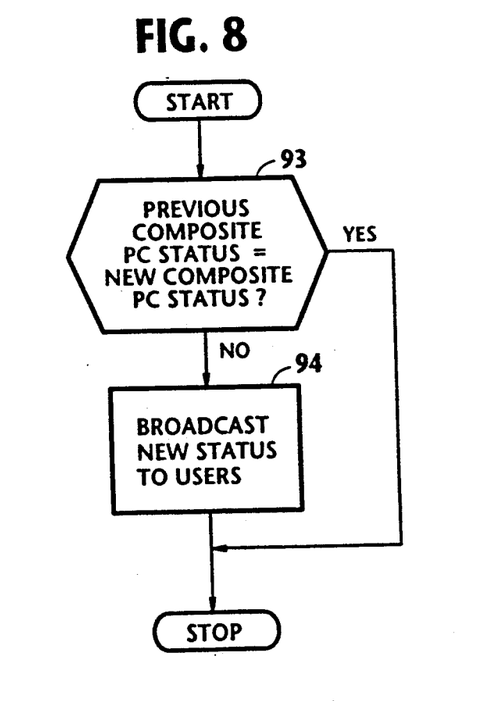
FIG. 8 is a flowchart showing instructions executed by the point code read/write controller to broadcast composite state information to user terminals when point code status update occurs.

With a composite state database created in memory field 14e, the latter is ready to be accessed in a read mode by controller 13. When an update of any of memory fields 14a, 14b, 14c or 14d occurs, steps 93 and 94 of the algorithm shown in FIG. 8 are executed to broadcast composite state information to SCCP users.

In FIG. 6, program execution starts with step 71 to check the MTP status field of a memory cell. If it is in the allowed state, control exits to step 72 to check the SCCP status field of the memory cell. If it is in the allowed state, control moves further on to step 73 to check to see if the MTP congestion level of the memory cell is zero. If the answer is affirmative, control advances to step 74 to check to see if the SCCP congestion level of the memory cell is zero. If the answer is affirmative, control exits to step 80 to store an allowed state into the composite status field 14e of the memory cell. If either the MTP status field or the SCCP status field of the memory cell is in the prohibited state, control exits to step 79 to store a prohibited state into the composite status field of the cell.

If the answer is negative in either step 73 or 74, control proceeds to step 75 to make a comparison between the MTP congestion level and the SCCP congestion level of the memory cell. If the MTP congestion level is equal to or higher than the SCCP congestion level, exit is to step 76 to adopt the higher MTP congestion value. Otherwise, exit is to step 77 to adopt the higher SCCP congestion value. The adopted congestion value is stored into the composite status field of the cell (step 78).

Figure 5:
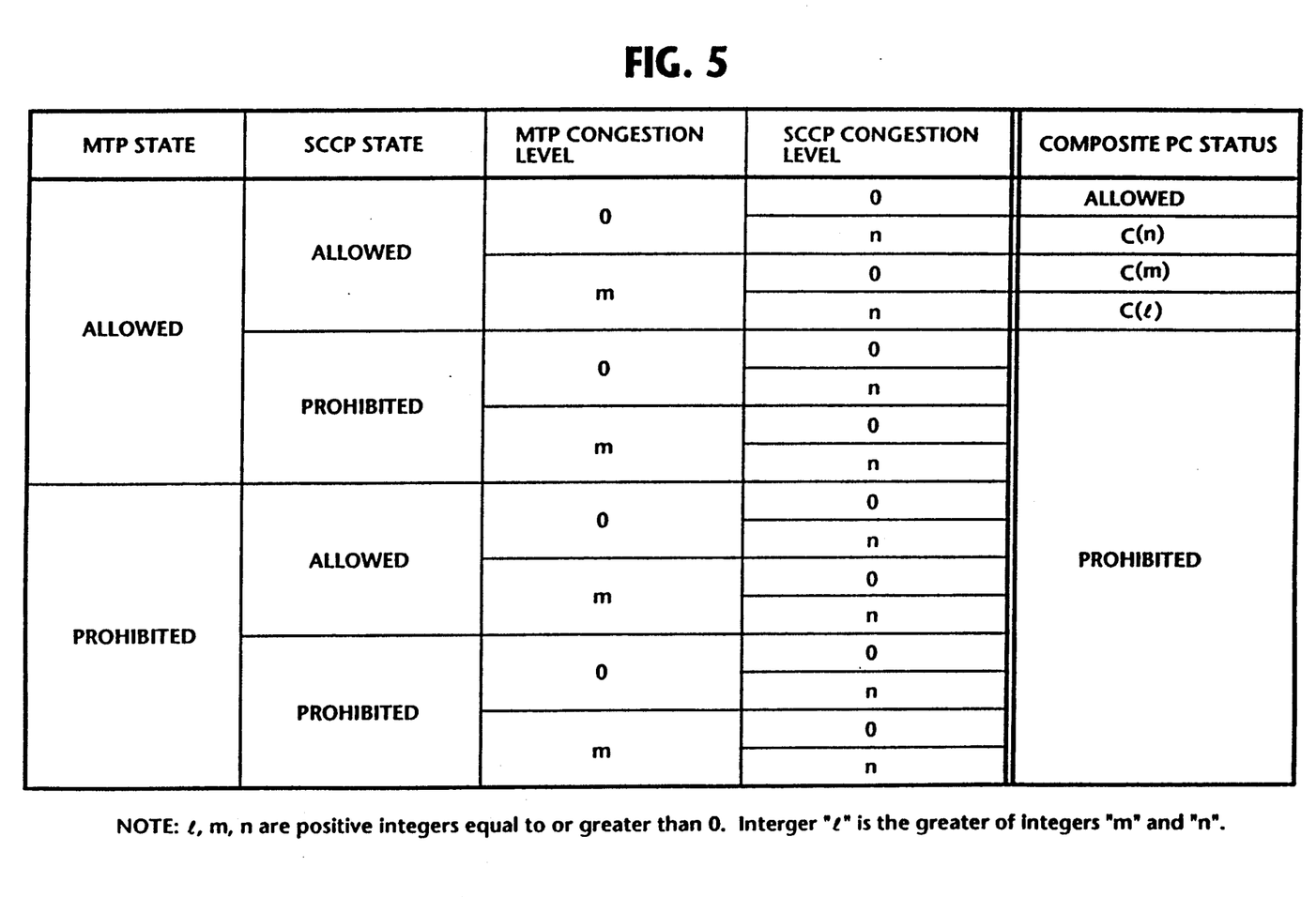
FIG. 5 is a list of MTP and SCCP states and MTP and SCCP congestion levels and possible composite point code states.

The rightmost column of FIG. 5 shows five possible composite point code states derived according to the algorithm of FIG. 6. More specifically, the composite status field is set to "allowed" if the MTP and SCCP status fields are both in the allowed state while the MTP and SCCP congestion levels are both at zero. With the MTP and SCCP status fields being set to "allowed", there are three possible congestion levels C(n), C(m) and C(l), where n and m respectively represent the congestion values of the MTP and SCCP congestion level fields, and l is the greater of congestion values m and n. With the MTP status field being set to "allowed" and the SCCP status field to "prohibited", the composite PC status field is unconditionally set to "prohibited". When the MTP status field is set to "prohibited", the composite PC status field is likewise unconditionally set to "prohibited".

Figure 7:
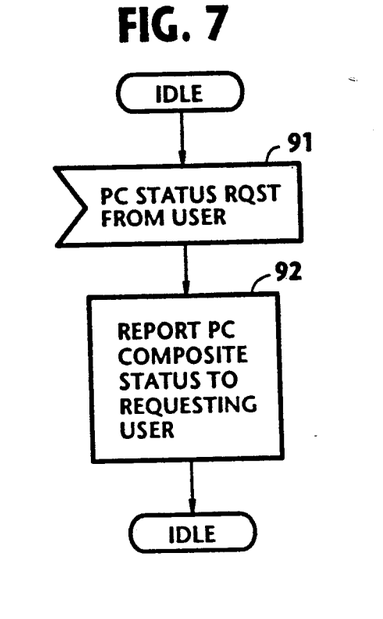
FIG. 7 is a flowchart showing instructions executed by the point code read/write controller in response to receipt of a request from user terminals.

In FIG. 7, the read/write controller 13 receives a PC status request from a user terminal (step 91), control executes step 92 by reading the contents of the composite PC status fields of the point code requested and reports the composite status information of the signaling node to the requesting user. Thus users are provided with a single integrated view of the status of network nodes.

Figure 9:
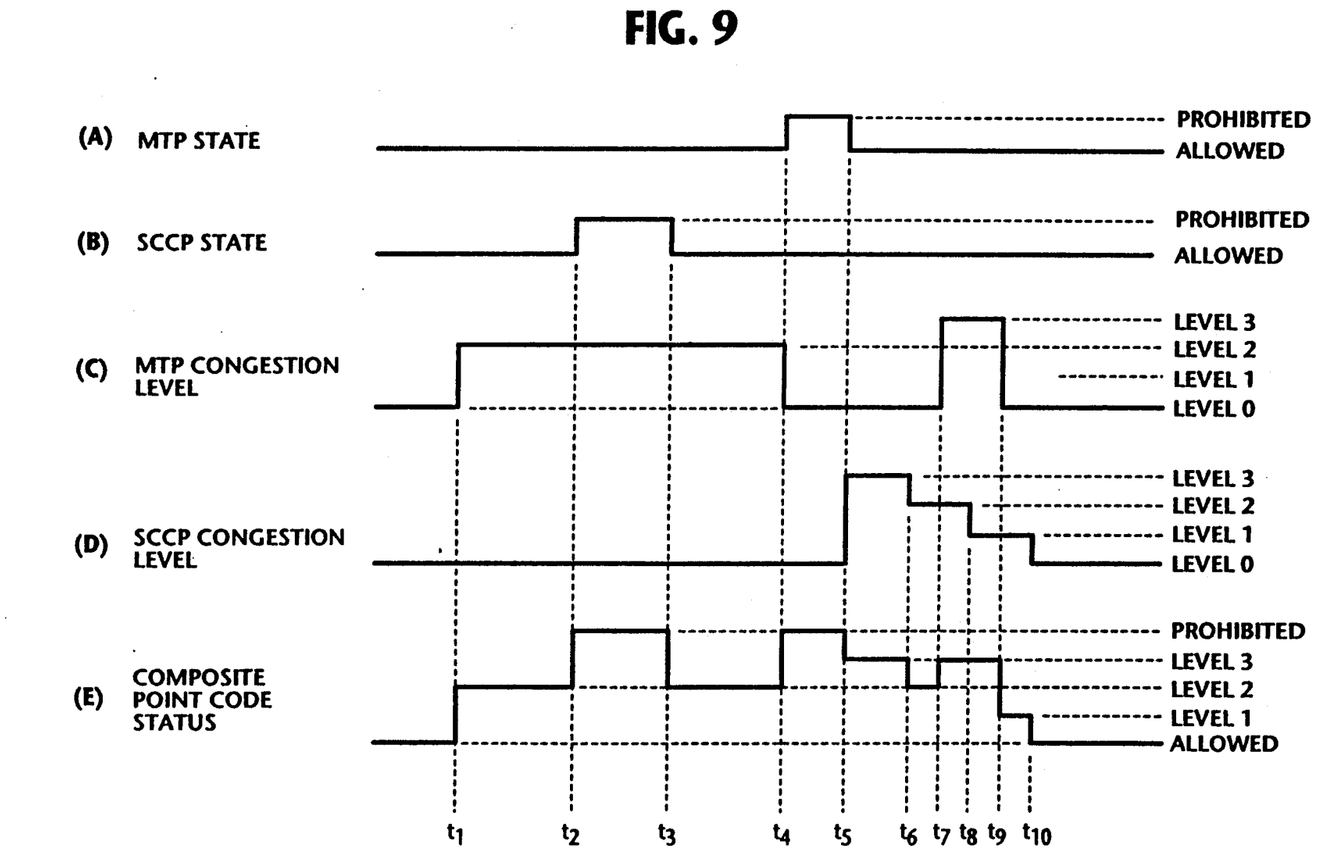
FIG. 9 is a timing diagram illustrating an example of the changing state of a composite point code state.

FIG. 9 shows one example of the composite point code status of a memory cell under varying MTP and SCCP states and varying MTP and SCCP congestion levels. During a period prior to time $t_1$, the MTP and SCCP status fields are both in the allowed state and the MTP and SCCP congestion level fields are both at zero level. Therefore, the composite status of the associated point code is in the allowed state. At time $t_1$, the MTP congestion level switches to a level 2. By examining FIG. 5, it is seen that congestion level C(2) is adopted and stored into the composite status field of the memory cell. During an interval between times $t_2$ and $t_3$, the SCCP state is "prohibited" while the MTP congestion level C(2) is maintained. The composite PC state is changed to "prohibited" at time $t_2$ and remains in that state until time $t_3$. At time $t_4$, the MTP congestion level switches to zero and the MTP status changes to "prohibited" and remains in this state until time $t_5$. The composite PC state switches from congestion level C(2) to "prohibited" at time $t_2$ and remains in this state until time $t_5$. At time $t_6$, the MTP state changes to "allowed" and the SCCP congestion level rises to level 3, causing the composite PC state to change from "prohibited" to a congestion level C(3). This congestion level is successively decremented at times $t_6$, $t_8$ and $t_{10}$ until it reaches zero. The MTP congestion level rises from zero to level 3 at time $t_7$ and falls to zero at time $t_9$. Since the MTP congestion level is higher than the successive SCCP congestion levels during the interval between $t_7$ and $t_9$, the higher MTP value is adopted for the composite PC state.

User terminals send a message together with an indication of priority level. Routing controller 12 compares the user's priority level with data stored in the composite PC status field of an associated memory cell. If the priority level is higher than a congestion level, the routing controller 12 allows the message to be passed on to message transport controller 18; otherwise it blocks the message. If the composite status field of a point code is in the prohibited state, all messages destined to the corresponding signaling node are blocked. If it is in the allowed state, all messages are transmitted to the signaling node.

The routing control as taught by the present invention thus eliminates the need for applications to maintain a congestion status database in order to meet the requirement set forth in CCITT Recommendations that users of the SCCP are to be notified of changes in the status of point codes, while freeing applications from the need to have individual network congestion control functions. Another benefit of the present invention is that the SCCP congestion control provides a phased traffic restoration procedure to recovering signaling nodes to protect operation of the message transfer part.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A common channel signaling network comprising a plurality of signaling points interconnected by signaling data links, each of said signaling points comprising:
   a message transport controller coupled to a signaling data link of the network for transmitting and receiving messages to and from remote signaling points, the received messages containing management information concerning the remote signaling points; and
   a subsystem controller connected to said message transport controller for directing messages to user terminals,
   the subsystem controller comprising:
   a point code status controller for analyzing said management information and maintaining availability state of the message transport controller of said remote signaling points, availability state of the subsystem controller of said remote signaling points, congestion level of the message transport controller of said remote signaling points and congestion level of the subsystem controller of said remote signaling points, deriving from the maintained availability states and congestion levels a composite state for each remote signaling point, and presenting the composite state to the user terminals; and
   a routing controller for routing a message between said message transport controller and said user terminals in accordance with said composite state.

2. A common channel signaling network as claimed in claim 1, wherein said point code status controller comprises a memory having a plurality of memory cells each being addressable with a point code identifying a remote signaling point for storing the availability state of the message transport controller of the remote signaling points, the availability state of the subsystem controller of the remote signaling points, the congestion level of the message transport controller of the remote signaling points and the congestion level of the subsystem controller of the remote signaling points, and the composite state.

3. A common channel signaling network as claimed in claim 1, wherein said point code status controller presents the composite state to the user terminals upon request therefrom.

4. A common channel signaling network as claimed in claim 1, wherein said point code status controller presents a new composite state to the user terminals when an update occurs in the composite state.

5. A common channel signaling network as claimed in claim 1, wherein said routing controller includes means for receiving a message from the user terminals indicating a priority level of the message, comparing the priority level with the composite state, and passing the received message to the message transport controller if the priority level is higher than a level indicated by the composite state or blocking the received message if the priority level is lower than said indicated level.

6. A common channel signaling network as claimed in claim 1, wherein the point code status controller includes means for decrementing the value of the congestion level of the subsystem controller at periodic intervals.

7. A common channel signaling network as claimed in claim 1, wherein said point code status controller derives said composite state such that:
   (1) the composite state indicates "allowed" state if the availability states of the message transport controller and subsystem controller both indicate that a concerned remote signaling point is accessible and the congestion levels of the message transport controller and subsystem controller are both at zero;
   (2) the composite state indicates "prohibited" state if the availability state of the message transport controller indicates that the concerned remote signaling point is inaccessible or the availability states of the message transport controller and subsystem controller indicate respectively "allowed" and "prohibited" states;

(3) the composite state indicates the congestion level of the subsystem controller when both of said availability states indicate "allowed" state and the congestion level of the message transport controller is at zero;

(4) the composite state indicates the congestion level of the message transport controller when both of said availability states indicate "allowed" state and the congestion level of the subsystem controller is at zero; and (5) the composite state indicates the greater of the congestion levels of the message transport controller and the subsystem controller when both of said availability states indicate "allowed" state.

8. A method of transmitting messages in a common channel signaling network comprising a plurality of signaling points interconnected by signaling data links, each of said signaling points including a message transport controller for transmitting and receiving messages to and from remote signaling points, and a subsystem controller connected to said message transport controller for directing messages to user terminals, the method comprising the steps of:

a) receiving messages from remote signaling points via said signaling data links;

b) analyzing each of the messages into an availability state of the message transport controller of the remote signaling points, an availability state of the subsystem controller of the remote signaling points, a congestion level of the message transport controller of the remote signaling points and a congestion level of the subsystem controller of the remote signaling points;

c) deriving a composite state from said availability states and congestion levels; and d) routing messages from the user terminals in accordance with said composite state.

9. A method as claimed in claim 8, further comprising the steps of receiving a request from a user terminal and reporting thereto said composite state.

10. A method as claimed in claim 9, further comprising the steps of broadcasting a new composite state to the user terminals when an update occurs in said composite state.

11. A method as claimed in claim 8, wherein the step (c) comprises the steps of:

(c1) causing the composite state to indicate "allowed" state if the availability states of the message transport controller and the subsystem controller of the remote signaling points both indicate that a concerned remote signaling point is accessible and the congestion levels of the message transport controller and the subsystem controller of the remote signaling points are both at zero;

(c2) causing the composite state to indicate "prohibited" state if the availability state of the message transport controller of the remote signaling points inidicates that the concerned remote signaling point is unaccessible or the availability states of the message transport controller and the subsystem controller of the remote signaling points indicate respectively "allowed" and "prohibited" states;

(c3) causing the composite state to indicate the congestion level of the subsystem controller of the remote signaling points when the availability states of the message transport controller and subsystem controller of the remote signaling points both indicate "allowed" state and the congestion level of the message transport controller of the remote signaling points is at zero;

(c4) causing the composite state to indicate the congestion level of the message transport controller of the remote signaling points when both of said availability states indicate "allowed" state and the congestion level of the subsystem controller of the remote signaling points is at zero; and (c5) causing the composite state to indicate the greater of the congestion levels of the message transport controller and of the subsystem controller of the remote signaling points when both of said availability states indicate "allowed" state".

12. A method as claimed in claim 8, wherein the step (d) comprises the steps of:

d1) receiving a message from the user terminals indicating a priority level of the message;

d2) comparing the priority level with the composite state; and d3) passing the received message to the signaling data link if the priority level is higher than a level indicated by the composite state or blocking the received message if the priority level is lower than said indicated level.

13. A method as claimed in claim 8, further comprising the step of decrementing the value of said congestion level of the subsystem controller of the remote signaling points at periodic intervals.

* * * * *